May 8, 1928.                                                    1,668,590
M. HILFREICH
PROCESS OF MANUFACTURING BLOCKS OF ARTIFICIAL RESIN
IN DIFFERENTLY COLORED LAYERS
Filed April 22, 1927

INVENTOR
Max Hilfreich
By
Attorney

Patented May 8, 1928.

1,668,590

UNITED STATES PATENT OFFICE.

MAX HILFREICH, OF VIENNA, AUSTRIA.

PROCESS OF MANUFACTURING BLOCKS OF ARTIFICIAL RESIN IN DIFFERENTLY-COLORED LAYERS.

Application filed April 22, 1927, Serial No. 185,839, and in Austria March 24, 1927.

This invention relates to a process of manufacturing blocks of artificial resin in differently colored layers.

Heretofore the need for objects of artificial resin, consisting of differently colored parts, has been satisfied by making the desired article, for instance a cigarette-holder, of individual differently colored pieces of artificial resin which finally were screwed together. However in time this connection is loosened in consequence of the influence of varying temperatures and contraction or shrinkage. Another proposal to produce a multi-colored article consists in employing a block of artificial resin, which is composed of several differently colored layers. These blocks are produced in that individual differently colored artificial resin plates are stuck together by means of artificial resin in liquid condition and the block thus produced is subjected to the hardening process, whereby pressure is usually applied. After the hardening, the plates stick firmly together. A satisfactory article is produced in this manner, but this method of manufacture is very expensive. In order to perform this process the single-color blocks of artificial resin have to be cut up into so many plates as layers are wanted. This preliminary step of the process called "pre-cutting", causes a considerable loss of material. Furthermore, only quite smooth layers have to be stuck together and therefore, after the cutting, the plates which are to be united with one another have to be polished on an emery wheel or disc, which again gives rise to a loss of material. Further considerable quantities of resin in a liquid condition are necessary for the sticking operation, which also increases the costs of the process. In consequence of the fact that the artificial resin blocks as actually manufactured are shaped somewhat conical and usually are slightly displaced with respect to one another, even if guiding members are provided for, the outer faces of the blocks produced by sticking are not plain or flat and therefore have to be cut plain by means of a saw, which again means a loss of material. In consequence of the loss of material and the necessary amount of work, the costs of this method of manufacture are very great. Moreover the article, produced in the manner above referred to, is not free from objection, because frequently the thin layers of resin, which serve as the binding means between the plates, are visible in the final product, this being particularly the case if the plates are not sufficiently smooth or polished and have grooves or scratches. The binding means does not penetrate into the same and the finished article shows pellucid places between two colored layers.

Contrary to this binding method, the process according to the present invention consists in a casting process and the essential feature of the same consists in that suitably colored artificial resin, preferably in the shape of plates, is surrounded with artificial resin in a liquid condition, which if desired may be in a colored state and the product is hardened in the usual manner.

Several modes of carrying out the present invention are illustrated by way of example on the accompanying sheet of drawings in which—

Figure 7:
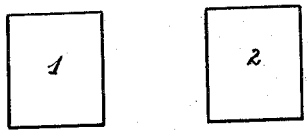
Figure 8:
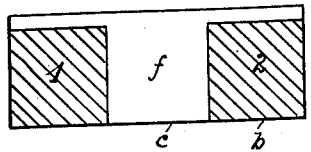

Figs. 7 and 8 a further mode of the process in which two individual moulds are applied.

Figure 1:
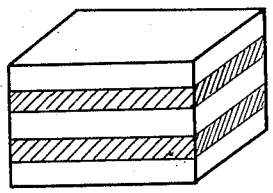
Fig. 1 shows a block of artificial resin, which is composed of a number of colored layers.
Figure 2:
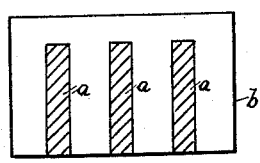
Figs. 2, 3 and 4 illustrate the process according to the present invention when working with one mould only.

For instance if it is desired to produce a block composed of a number of layers and in which every second or alternate layer is to be of the same color, at first plates of the desired thickness are cut from differently colored blocks of artificial resin. Hereafter these plates $a$ (Fig. 2) are inserted in a sheet-metal mould $b$ of the required form. The various plates are held in position by suitable projections of the sheet-metal mould, and now artificial resin in a liquid condition and of one color is poured between the individual plates in the direction of the arrows. The block is hardened in the usual manner and finally the sheet-metal mould is torn open.

Figure 3:
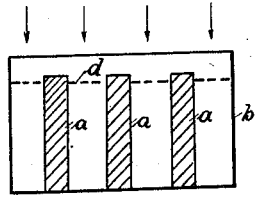
Figure 4:
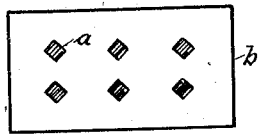

However it is not necessary to insert in the mould whole plates, pieces of artificial resin of any other shape may be introduced into the moulds. These pieces $a$ may be arranged in the manner shown in plan view in Fig. 4. In this case an appropriate means such as a network $d$ or the like (Fig. 3) may be employed for securing the pieces, the top ends of the latter being fixed by the meshes of the said network. The artificial resin in a liquid condition is poured in through the meshes of the network, and hereafter the hardening operation takes place.

Figure 5:
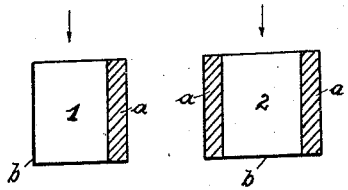
Figs. 5 and 6 show a method where two individual moulds are used.
Figure 6:
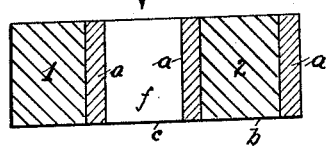

If it is desired that all the plates are of different colors, the method according to Figs. 5 and 6 is resorted to, whereby two part-moulds 1 and 2 of a composite mould are employed. As illustrated for instance the part-mould 1 may consist of a sheet-metal casing with one of the side walls removed, whereby the latter is replaced by an artificial resin plate $a$, which is tightly fitted in the mould. The part-mould 2 consists of a sheet-metal casing provided with two tightly fitting side walls $a$ of artificial resin, which are disposed opposite one another. These part-moulds are hardened and, as shown in Fig. 6, are united with one another at the base by sheet-metal $c$, for instance by soldering. Also the side walls of the moulds 1 and 2 are united with one another by means of sheet-metal plates, so that a hollow space $f$ is formed between the moulds 1 and 2, the same being filled with resin in liquid condition and subsequently hardening takes place.

However according to the present invention there is no need of cutting plates at all. In this event artificial resin in a liquid condition is poured into the moulds 1 and 2 (Fig. 7) and hardened. Now a side wall is removed from each sheet-metal casing and the base and side walls are united by soldering sheet-metal plates $c$ (Fig. 8) to the casings. Thereby care is to be taken, that the side faces of the blocks, from which the sheet-metal sides have been removed, face each other. Now resin in a liquid condition is poured into the clear space between the blocks 1 and 2 and is hardened. In this manner a block is produced, which consists of three differently colored layers, the employment of plates being dispensed with.

The problem of a simple and inexpensive manufacture of artificial resin blocks composed of a number of layers is satisfactorily solved by the casting process as described in combination with the employment of auxiliary sheet-metal moulds. The faces of the individual layers are distinct, and transparent intermediate layers cannot arise at the borders of the colored layers, because an agglutinant is not employed. The process according to the present invention is also less expensive than the known sticking method, fewer plates are employed as heretofore and therefore the loss of material caused by "pre-cutting" the plates is materially reduced and can be dispensed with entirely, because the blocks may be produced without the use of plates. The plates do not require to be ground smooth and they cannot get shifted or displaced with respect to one another, because they are bordered by firm walls. Further also the application of pressure is dispensed with. The saving of material and work is quite obvious. Extra costs only arise for the manufacture of the sheet-metal moulds for every individual block. However these expenses are very small, because the tin-plate used for preparing these moulds may be very thin and is at disposal in the factories occupied with the manufacture of artificial resin in the form of the tin-plate drums in which the carbolic acid is usually furnished. As compared with the sticking method between 30 and 40% are saved by the process according to the present invention.

I claim—

1. A process of manufacturing blocks of artificial resin in differently colored layers consisting in pouring artificial resin in a liquid condition around hard artificial resin of the desired color, and subsequently hardening the block thus produced.

2. A process of manufacturing blocks of artificial resin in differently colored layers, consisting in pouring artificial resin in a liquid condition around artificial resin plates of the desired colors, and subsequently hardening the block thus produced.

3. A process of manufacturing blocks of artificial resin in differently colored layers, consisting in pouring colored artificial resin in a liquid condition around artificial resin plates of the desired colors, and subsequently hardening the block thus produced.

4. A process of manufacturing blocks of artificial resin in differently colored layers, consisting in inserting and securing artificial resin plates of the desired colors in a mould, pouring artificial resin in a liquid condition around the said plates, and subsequently hardening the block thus formed.

5. A process of manufacturing blocks of artificial resin in differently colored layers, consisting in inserting suitably shaped and colored pieces of artificial resin in a mould, securing the said pieces in the mould to the floor of the latter and by a network arranged near the open top of the mould, filling out the clear spaces between the said artificial resin pieces by pouring artificial resin in a liquid condition around the latter, and subsequently hardening the block thus formed.

6. A process of manufacturing blocks of artificial resin in differently colored layers, consisting in inserting suitably shaped and colored pieces of artificial resin in a mould, securing the said pieces in the mould to the floor of the latter and by means arranged near the open top of the mould, filling out the clear spaces between the said artificial resin pieces by pouring artificial resin in a liquid condition around the latter, and subsequently hardening the block thus formed.

7. A process of manufacturing blocks of artificial resin in differently colored layers, consisting in tightly fitting an artificial resin plate of the desired color into the open side of a mould which is open at one side-wall, tightly fitting another artificial resin plate of the desired color into the open side of a second mould which is open at one side-wall, pouring artificial resin in a liquid condition into the said moulds, hardening the blocks thus formed, uniting to a composite mould the two moulds with the artificial resin blocks therein so that the two artificial resin plates face each other and a clear space remains between the said two plates, filling out the clear space with artificial resin in liquid condition, and subsequently hardening the block thus formed.

8. A process of manufacturing blocks of artificial resin in differently colored layers, consisting in tightly fitting an artificial resin plate of the desired color into each of two oppositely disposed open sides of a mould, tightly fitting another artificial resin plate of the desired color into the open side of a second mould which is open at one side-wall, pouring artificial resin in liquid condition into the said moulds, hardening the blocks thus formed, uniting to a composite mould the two moulds with the artificial resin blocks therein so that two artificial resin plates face each other and a clear space remains between the two plates last mentioned, filling out the clear space with artificial resin in a liquid condition, and subsequently hardening the block thus formed.

9. A process of manufacturing blocks of artificial resin in differently colored layers, consisting in tightly fitting an artificial resin plate of the desired color into each of two oppositely disposed open sides of a mould tightly fitting an artificial resin plate of the desired color into each of two oppositely disposed open sides of another mould, pouring artificial resin in liquid condition into the said moulds, hardening the blocks thus formed, uniting to a composite mould the two moulds with the artificial resin blocks therein so that two artificial resin plates face each other and a clear space remains between the two plates last mentioned, filling out the clear space with artificial resin in a liquid condition, and subsequently hardening the block thus formed.

10. A process of manufacturing blocks of artificial resin in differently colored layers, consisting in pouring artificial resin in a liquid condition and of the desired color into two moulds, hardening the blocks thus formed, removing a side-wall of each mould and disposing the moulds in such a manner that the open sides face one another, uniting to a composite mould the two moulds with the artificial resin blocks therein so that the latter face each other and a clear space remains between the two blocks, filling out the clear space with artificial resin in a liquid condition, and subsequently hardening the block thus formed.

In testimony whereof I affix my signature.

ING. MAX HILFREICH.